J. DUNSTONE.
PROCESS FOR TREATING METALLIC SLIMES.
APPLICATION FILED NOV. 2, 1908.
956,800.
Patented May 3, 1910.
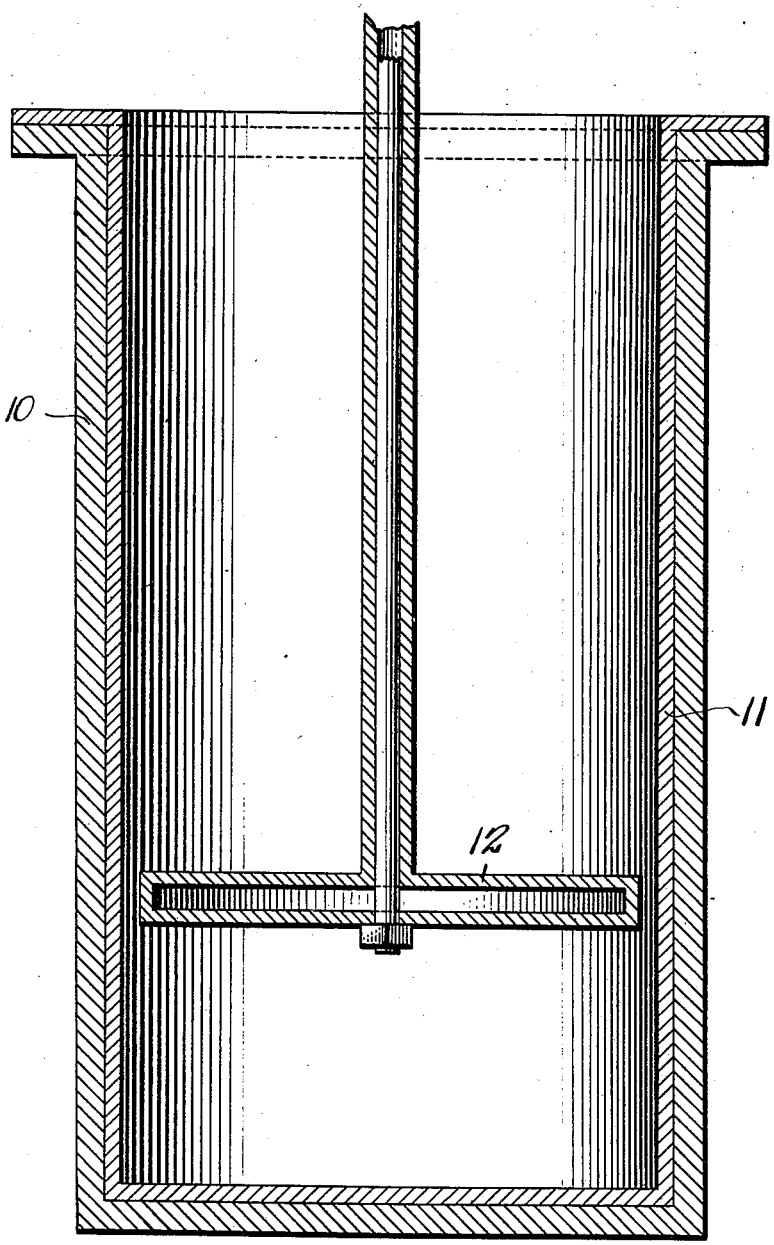
Witnesses
Chas. C. Richardson
Inventor
James Dunstone,
By Chandler & Chandler
Attorneys.

UNITED STATES PATENT OFFICE.

JAMES DUNSTONE, OF DOLLAR BAY, MICHIGAN.

PROCESS FOR TREATING METALLIC SLIMES.

956,800. Specification of Letters Patent. Patented May 3, 1910.

Application filed November 2, 1908. Serial No. 460,715.

*To all whom it may concern:*

Be it known that I, JAMES DUNSTONE, a citizen of the United States, residing at Dollar Bay, in the county of Houghton, State of Michigan, have invented certain new and useful Improvements in Processes for Treating Metallic Slimes; and I do hereby declare the following to be a full, clear, and exact description of the invention, such as will enable others skilled in the art to which it appertains to make and use the same.

This invention relates to a process for treating the slimes from stamp mills employed in crushing ore containing native metals.

While the process has equal application to other ores it will be herein described as specifically applied to copper ore for the purpose of illustrating the method of application.

In the treatment of such ores as those found in the copper mines of the Lake Superior district, the ores are worked to recover native copper. This copper is embedded in what is called vein rock, the copper granules varying in size from pieces as large as chestnuts to microscopic particles. The latter grade is so fine that the ordinary methods of separation are ineffective, it resembling flour to the touch.

In working the ore the vein rock is sent from the mine to a stamp mill in pieces of varying sizes. At the stamp mill, the rock is crushed to free the metallic copper from its matrix. The copper being of a greater specific gravity than the sand resulting from the crushing is easily separated by the usual hydraulic method so long as the particles are of sufficient size to readily sink through water. With the finest grains or slimes, the problem of separation becomes more difficult. The rougher or larger grains can be sent directly from the stamp mills to the smelter and the concentrate thus sent contains from seventy-five to ninety per cent. of metallic copper. The slime concentrate, however, contains only about fifteen per cent. copper so that in order to recover three hundred pounds of copper from the slimes two thousand pounds of slime has to be smelted, making it necessary to smelt seventeen hundred pounds of slime sand in addition to the metallic copper. This process is naturally very expensive. Hitherto, attempts to concentrate the slimes so that more than fifteen per cent. of metallic copper will be contained therein have resulted in failure owing to the fact that some of the copper was lost in the attempt. Even when the slime is concentrated to give values of fifteen per cent. copper the refuse from the concentration process contains one-fourth of one per cent. of the copper.

The object of the present invention is to provide a cheap and economical means of concentrating the metallic slimes resulting from the crushing of ores containing native metal so that all of the metal will be separated from the slime.

In the accompanying drawing reference characters are used to indicate the several parts, and the figure represents a vertical section through a form of apparatus adapted for use with this process.

With this object in view, the slimes are subjected to the following treatment. A charge of slime concentrate is placed in a suitable vessel 10 provided with a metallic lining 11. It is then covered with water to a suitable depth, this being determined by the grade of ore and nature of the metal to be treated. To this there is added one pound of sulfuric acid to about one hundred and twenty pounds of the charge of slime. This mixture is then violently agitated by any suitable means such as a plunger 12 until a thin sheet of copper appears on the surface of the water. When this occurs a light mineral oil such as kerosene is added to the extent of four times as much in bulk as the charge of slime. The entire charge is now agitated until an emulsion is formed and when this takes place the globules of oil take up the particles of metal and the process continues, the emulsion forming on the top of the entire charge assumes the appearance of a copper froth. More water is now added to the extent of about three-fourths as much water as the charge of oil and the agitation continued until a temporary oil and water emulsion is formed. The emulsion thus formed is now drained off at a point just above the point occupied by the sand from the slimes and is received in a suitable vessel. There it is allowed to rest quietly when the separation will be complete, the copper sinking to the bottom, the water forming a layer above the copper, and the oil separating from the water and lying on top thereof. The manner of accomplishing this may be varied by the employment of different styles of apparatus, but if the process be carried out the result will invariably be the same, all of the metal being separated from the slimes and passing off with the emulsion.

Experimentally this may be accomplished in the following manner:—Place about one-half a pound of slime concentrate in a large clear glass bottle. Put in enough water to cover and about one-half inch over. Add to this one-teaspoonful of sulfuric acid. Shake well until a thin sheet of copper forms on the surface of the water. Now add common kerosene about four times as much in bulk as the sand or slime concentrate. Continue the shaking process until particles of copper will be noticed coming together and there seems to be a copper scum formed on top of the mixture. At this point add about three-fourths as much water as there is oil in the bottle, and give the bottle a few violent perpendicular shakes. This will complete the separation, a temporary oil and water emulsion being formed and in this will be seen a multitude of tiny globules of oil which resemble globules of copper owing to the fact that the copper has been taken up and adheres to the oil. At a little distance the mixture will seem to hold in suspension a shining mass of copper about two inches high and two and one-half inches in diameter. The liquid is then drained off into a suitable vessel and allowed to rest. The emulsion is destroyed during the period of rest and the copper sinks to the bottom of the vessel. By draining off the liquid the slime sand remains in the bottom of the original bottle as a black and sticky mass. This result can be obtained on a larger scale by agitating by means of a loose plunger which is provided with a plurality of perforations and given an up and down motion by any suitable mechanism.

Whether the operation be performed on the small scale just described or on the larger scale previously described, the result is the same and all of the metal is separated from the slimes. The metal thus separated may then be sent to the smelter for treatment in the usual manner.

It is to be noted that the oil may be used frequently by being drawn off the water after it has separated therefrom during the period of rest.

There has thus been provided a cheap and efficient process of the character described and for the purpose set forth. It has been further found that in some instances a small percentage of nitrate of soda dissolved in the water increases the rapidity of the action.

Having thus described my invention, what is claimed as new, is:—

1. The process consisting in agitating copper slimes in the presence of an emulsion of oil, an aqueous solution of sodium nitrate, and an acid adapted to decompose the sodium nitrate, and collecting the portion floated.

2. The process consisting in agitating copper slimes in the presence of an emulsion of kerosene oil, an aqueous solution of sodium nitrate, and an acid adapted to decompose the sodium nitrate, and collecting the portion floated.

3. The process consisting in agitating copper slimes in the presence of an emulsion of kerosene oil, an aqueous solution of sodium nitrate, and sulfuric acid, and collecting the portion floated.

In testimony whereof, I affix my signature, in presence of two witnesses.

JAMES DUNSTONE.

Witnesses:
JAMES MILLER,
HENRY WARMINGTON.